United States Patent [19]

Nagano

[11] Patent Number: 4,901,824
[45] Date of Patent: Feb. 20, 1990

[54] BICYCLE BRAKE SHOE HAVING SLIT SURFACES

[75] Inventor: Masashi Nagano, Izumi, Japan

[73] Assignee: Shimano Industrial Company Limited, Osaka, Japan

[21] Appl. No.: 680,466

[22] Filed: Dec. 11, 1984

[51] Int. Cl.⁴ .................... F16D 69/00; F16D 65/00
[52] U.S. Cl. ................... 188/73.1; 188/250 B; 188/250 G
[58] Field of Search .............. 188/250 G, 250 B, 73.1, 188/71.1, 24.14, 24.12, 70 B, 72.2, 342, 82.8, 253, 261

[56] References Cited

U.S. PATENT DOCUMENTS

| | | | |
|---|---|---|---|
| 548,939 | 10/1895 | Whitcomb | 188/261 |
| 2,850,124 | 9/1958 | Grote | 188/261 X |
| 3,434,276 | 1/1969 | Robinette | 188/72.2 |
| 3,840,093 | 10/1974 | Hamayasu | 188/250 B X |
| 4,135,606 | 1/1979 | Lewis | 188/250 B X |

FOREIGN PATENT DOCUMENTS

| | | | |
|---|---|---|---|
| 682263 | 9/1939 | Fed. Rep. of Germany | 188/261 |
| 1116558 | 11/1961 | Fed. Rep. of Germany | 188/24.12 |
| 2110098 | 11/1971 | Fed. Rep. of Germany | . |
| 808675 | 2/1937 | France | 188/261 |
| 813627 | 6/1937 | France | . |
| 8183229 | 9/1937 | France | . |
| 892521 | 4/1944 | France | 188/250 G |
| 897846 | 4/1945 | France | 188/261 |
| 2082293 | 12/1971 | France | . |
| 19052 | of 1895 | United Kingdom | 188/261 |
| 488382 | 7/1938 | United Kingdom | 188/261 |

Primary Examiner—Robert J. Oberleitner
Attorney, Agent, or Firm—Stevens, Davis, Miller & Mosher

[57] ABSTRACT

A bicycle brake shoe for making press contact with a bicycle wheel rim to apply a braking force thereto. The brake shoe includes a shoe body which is elongated in the rotation direction of the wheel rim and which has a braking surface opposite to the braked surface of the rim. The shoe body also includes at least one slit extending in a direction transverse to the longitudinal dimension of the braking surface and extending inwardly into the shoe body to a predetermined depth.

6 Claims, 2 Drawing Sheets

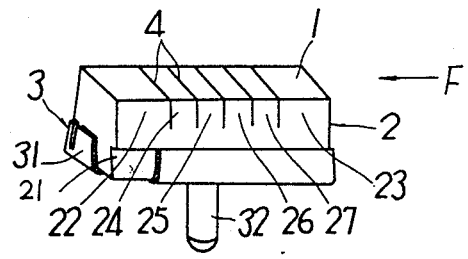
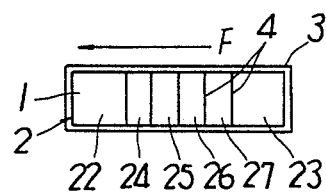
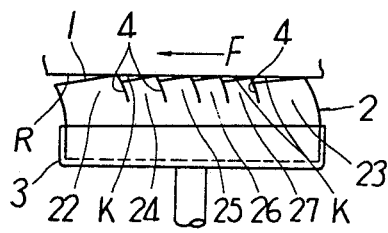
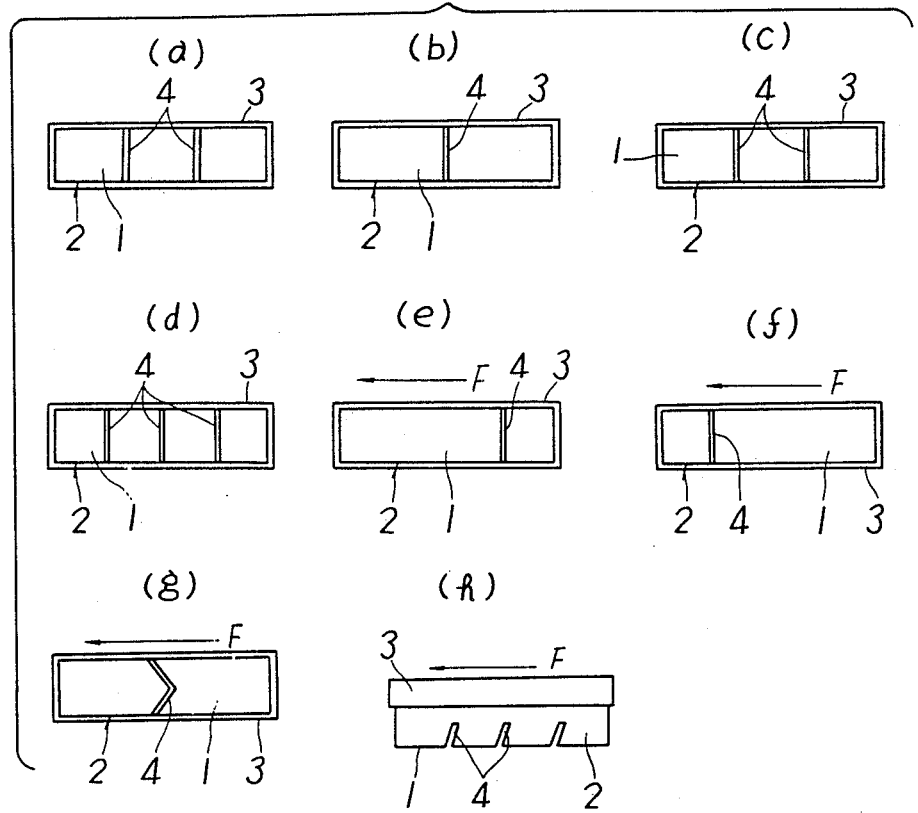

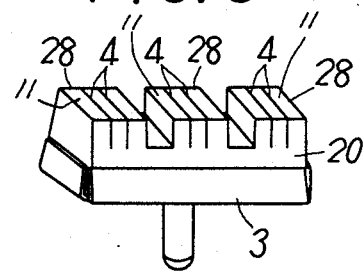
FIG. 5
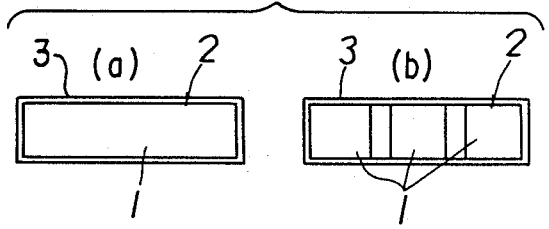
FIG. 7 PRIOR ART
FIG. 6
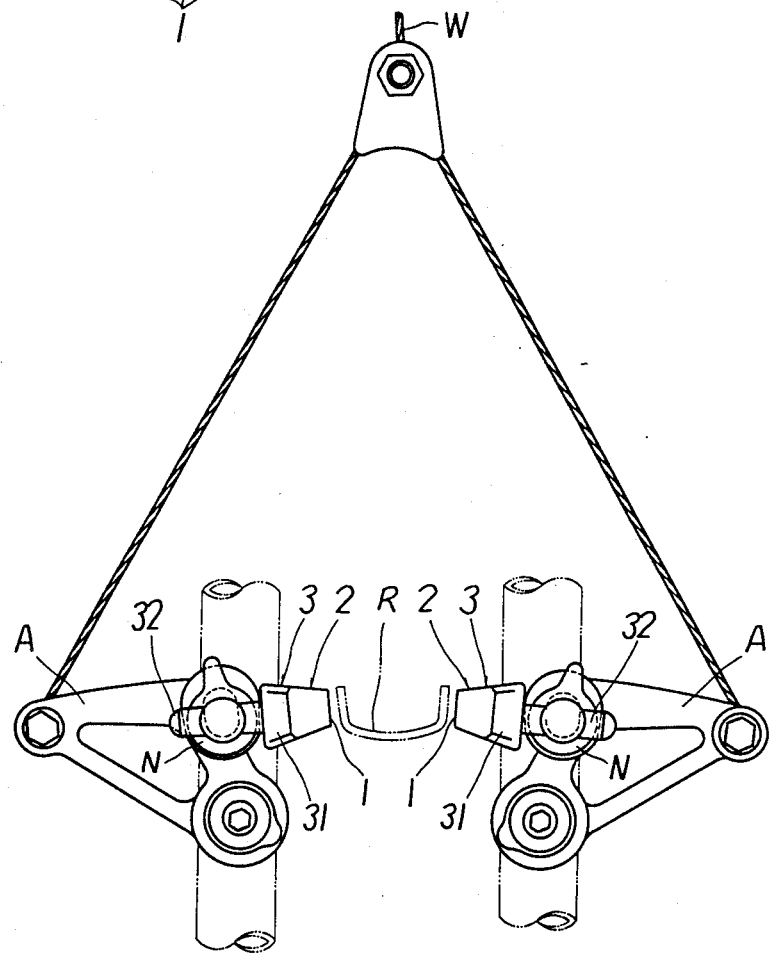

BICYCLE BRAKE SHOE HAVING SLIT SURFACES

FIELD OF THE INVENTION

This invention relates to a brake shoe for a bicycle, and more particularly to a bicycle brake shoe which comes into press-contact with a rim of the bicycle wheel to exert braking action thereon.

BACKGROUND OF THE INVENTION

Generally, brake shoes are used mainly for a caliper brake at the bicycle and comprise a shoe body which is elongated in the rotation direction of the wheel rim and which is formed in a rectangular parallelepiped shape having a flat braking surface opposite to the braked surface of the rim. Such brake shoes further include a shoe holder which holds the shoe at the side thereof opposite to the braking surface and which mounts the shoe to each of a pair of brake arms, the shoe body being formed of rubber-like material.

A brake lever is manually operated to actuate the brake arms to allow the shoes to move toward each other and to bring the braking surface of each brake shoe into press-contact with the rim, thereby exerting braking action against rotation of the bicycle wheel.

If a conventional brake shoe, as shown in FIG. 7-(a), is made flat at the braking surface thereof, it is difficult to bring the entire braking surface into press-contact uniformly with the rim, so that surface pressure is not increased with respect to a part of the braking surface to thereby diminish the braking effect to that extent. Also, the braking surface is subjected to surface pressure corresponding in amount only to an input by manually operating the brake lever, in other words, the surface pressure is not more than the input, resulting in less braking effect. The input need only increase in order to raise the surface pressure, but since an increase in the input is limited, it has been impossible to sufficiently raise the surface pressure.

Conventionally, a brake shoe has, as shown in FIG. 7-(b), been proposed which is provided at the shoe body with a plurality of projections each having a braking surface and each being spaced from each other at intervals to form grooves which do not come into contact with each other when braking action is applied.

Such shoe with projections enables the braking surface of each projection to come into press-contact with nearly the entire braked increase in surface of the rim, but the surface pressure is small in percentage. Also, a large space is formed between the rim and the groove so that rain water stays in the space and enters onto the braking surface of each projection to cause a slip between the braking surface of the projection and the braked surface of the rim, thereby resulting in diminished braking effect on a rainy day. Also, the conventional brake shoe occasionally generates noises in good weather.

SUMMARY OF THE INVENTION

In light of the above problems, this invention has been designed. An object of the invention is to provide a brake shoe whose braking surface has slits which divide the brake shoe into parts easily elastically deformable, so that each part at the shoe body, when the braking action is exerted, is deformed and rises at its rear edge in the rotation direction of the rim as a result of rotation thereof, thereby enabling the surface pressure at the braking surface to be greatly increased, preventing rain water from staying between the rim and the braking surface, and ensuring drainage by the rear edge of each shoe part. Also, noise-generation at the brake shoe in good weather is lessened.

To achieve the above objective, the shoe body of the invention is provided at the braking surface with at least one slit extending transverse to the longitudinal dimension of the shoe body and extending inwardly halfway toward the portion of the shoe body held by the holder.

The provision of slits on the braking surface facilitates elastic deformation in a portion of the shoe body at the braking surface side thereof, so that the rear edge at each part of the shoe body at the braking surface side is elastically upwardly deformed so as to stick to the wheel rim, and the side surfaces of the slits contact each other. Hence, larger surface pressure exceeding the input is applied to the rear edge during the braking action and the rear edge ensures drainage of rain water from the inner surface of the rim, allowing no rain water to stay in the slits, resulting in that, on a rainy day, the braking effect is greatly increased to ensure safety in operating the bicycle. Also, since the slits make the braking surface side portion of the shoe body easily deformable, noise generation in good weather is able to be reduced.

The above and further objects and novel features of the invention will be more fully apparent from the following detailed description when read in connection with the accompanying drawings.

BRIEF DESCRIPTION OF THE DRAWINGS

FIG. 1 is a partially cutaway perspective view illustrating one embodiment of a brake shoe of the invention, FIG. 2 is a plan view of the FIG. 1 embodiment, FIG. 3 is an illustration of the shoe in condition of exerting the braking action, FIGS. 4-(a) to -(h) are schematic views illustrating various kinds of slits at a shoe body of the invention, FIG. 5 is a perspective view of a modified embodiment of the invention, FIG. 6 is an illustration of the shoes of the invention assembled in a cantilever type caliper brake for the bicycle, and FIGS. 7-(a) and -(b) are illustrations of conventional brake shoes respectively.

DETAILED DESCRIPTION OF THE INVENTION

Referring to FIGS. 1, 2 and 6, a shoe used for a cantilever type caliper bicycle brake is shown. The brake shoe comprises a shoe body 2 formed in the shape of a rectangular parallelepiped having a braking surface 1 flat and opposite to the braked surface of the rim R and a holder 3 supporting the shoe body 2 at the side of shoe body 2 opposite to the side thereof facing braking surface 1 and mounted to each of pair of brake arms A. Shoe body 2 is formed of rubber-like material and has a stepwise trapezoidal cross section. Shoe body 2 has a longitudinal half at the side thereof held by holder 3, which is formed as a held portion 21 held by the holder 3.

The holder 3 comprises a holder body 31 having a rectangular base and four vertical segments rising therefrom and a mounting shaft 32 projecting outwardly from the base. Shoe body 2 is held at the held portion 21 into a box of the holder 3, and the mounting shaft 32 is mounted to each brake arm A by use of a mounting means, such as a nut N. A brake lever (not shown) is manually operated to actuate the arms A through a control wire W provided across the brake lever and each arm A, so that the shoe body 2 is brought into press-contact at the brake surface 1 with the braked surface of rim R.

In the embodiment of FIGS. 1 and 2, the shoe body 2 is provided with five slits 4 at the lengthwise central portion of braking surface 1, the slits 4 each extending perpendicularly to the longitudinal direction of the braking surface 1 and extending inwardly perpendicularly toward the held portion 21 held by the holder 3 and being very minute (approximately zero) in width. The upper half of shoe body 2 is divided by the slits 4 into two shoe parts 22 and 23 larger in thickness and formed at both ends of shoe body 2 and four shoe parts 24 to 27 smaller in thickness and spaced at uniform intervals.

Each slit 4, which is about 2 to 5 mm in depth, is largely affected by the material of which shoe body 2 is formed, thereby being not particularly defined. Also, it is preferable that a large number of slits 4 are provided, in which the slits 4 each are provided in pitch intervals of 1 to 3 mm.

Now, in the above described construction of the shoe, when the brake lever is operated to actuate each brake arm A to bring the braking surface 1 of shoe body 2 into press-contact with the braked surface of rim R, the shoe parts 22 to 27, which are made elastically deformable by the slits 4, are deformed to rise at their rear edges in the rotation direction F of the rim so as to stick thereto, thereby increasing the surface pressure at the rear edges by an amount more than an input by manual operation. Hence, the rear edge of each part 22-27, which applies a larger surface pressure to the braked surface of the rim, ensures drainage therefrom, and prevents rain water from staying in the slits 4, thereby providing improved safety in the bicycle's running during a rainy day. In addition, the drainage from each edge is discharged to the exterior through narrow gaps K, each surrounded by adjacent rear edges, the braking surface of each part 22-27 and the braked surface of rim R, as shown in FIG. 3.

Also, the braking surface side portion at the shoe body 2 is elastically deformable to thereby reduce generation of noise in good weather. In addition, a plurality of slits 4 of 1 to 3 mm in pitch intervals, when provided, can further reduce the generation of noise.

The foremost shoe part 22 in the rotation direction F of rim R is larger in thickness along a lengthwise dimension of shoe body 2 so as to withstand deflection more than other parts 24 to 27, thereby restraining excessive deflection thereof, thus keeping the gaps K always narrow and stable.

An experiment was conducted to compare braking effects in three kinds of shoes, that is, the shoe body 2 having five slits as shown in FIG. 1, a shoe body having no slit as shown in FIG. 7-(a), and a shoe body having slits larger in width and kept open even during the braking action as shown in FIG. 7-(b). The experiment was carried out under the following conditions: The caliper brake provided with the brake shoes was mounted to the bicycle frame, the rim R of the rear wheel and the shoe body 2 were kept wet by sprinkling water thereon, the bicycle was run on a predetermined paved road at constant speed, and the brake lever (not shown) at the bicycle handle was manually operated, whereby a braking distance X(m) required to stop the bicycle after the brake lever was operated, was measured.

The result of the experiment was that for conventional shoes having no slit and shoes having conventional slits larger in width, the braking distance was 31.0 m respectively, but the braking distance for the illustrated embodiment of the invention was 24.3 m, thus providing a braking distance which is reduced by about 25%.

Under the same experimental conditions, an experiment was conducted on brake shoes having various kinds of slits 4 and the braking distances were obtained as shown in the following table:

TABLE 1

| | | Slit 4 | | | |
|---|---|---|---|---|---|
| Slit Width B | Slit Number | Lengthwise Location at Braking Surface 1 | Widthwise Shape | Reference Drawing | Breaking Distance X (m) |
| 0 | 5 | Near the Center | Straight | FIGS. 1 and 2 | 24.3 |
| Max. Value B1 | 2 | Uniformly Divided | " | FIG. 4-(a) | 24.3 |
| B½ | 1 | Uniformly Divided | " | FIG. 4-(b) | 24.1 |
| " | 2 | Uniformly Divided | " | FIG. 4-(c) | 24.4 |
| " | 3 | Uniformly Divided | " | FIG. 4-(d) | 24.9 |
| " | 1 | Rear Side in Rotation Direction F | " | FIG. 4-(e) | 24.9 |
| " | 1 | Front Side in Rotation Direction F | " | FIG. 4-(f) | 27.3 |
| " | 1 | Central Portion | Rearward Chevron Shape in Rotation Direction | FIG. 4-(g) | 24.7 |

TABLE 1-continued

| | | Slit 4 | | | |
|---|---|---|---|---|---|
| Slit Width B | Slit Number | Lengthwise Location at Braking Surface 1 | Widthwise Shape | Reference Drawing | Breaking Distance X (m) |
| | | | F | | |
| | | Conventional No Slit | | FIG. 7-(a) | 31.0 |
| | | Conventional Slit larger in Width (Width > B1) | | FIG. 7-(b) | 31.0 |

In detail, the brake shoe having five slits each virtually zero in width and provided as shown in FIGS. 1 and 2, obtained a braking distance X of 24.3 m; that having two slits which are relatively larger in width and of the maximum values B1 in width during no braking action, which contact at the braking surface 1 during the braking action, and are provided as shown in FIG. 4-(a), obtained a braking distance of 24.3 m; and shoes having one, two and three slits each having a width half of the maximum value B1 and provided as shown in FIGS. 4-(b), -(c) and -(d), obtained a braking distance of 24.1 m, 24.4 m and 24.9 m respectively. Also, the brake shoe 2 each having only one slit 4 of B1/2 in width and provided as shown in FIGS. 4-(e) and -(f), obtained braking distances X of 24.9 m and 27.3 m respectively, and a shoe having only one slit of B1/2 in width and formed in a V-like shape oriented rearwardly in the rotation direction F of rim R and provided as shown in FIG. 4-(g), obtained a braking distance of 24.7 m.

From the experimental results, it is apparent that (1) slit 4 can be set in width between very close to zero and the maximum value B1, in other words, the width of slit 4 is not defined or limited to be very close to zero, but can be selected in a value range from very close to zero to the maximum value B1 which is to be zero due to contacting of the adjacent slit walls when the braking action is exerted, (2) one through five slits are preferred, with the foremost shoe part in the rotation direction F of rim R being made larger in thickness along a lengthwise dimension of the shoe body 2 than the thickness of the other shoe parts, thereby preventing excessive deflection thereof in order to obtain greater braking effect, (3) it is preferable that the slits, as shown in FIGS. 4-(a) to -(f), be formed in straight lines extending widthwise of the overall braking surface 1, in a V-like or U-like shape provided widthwise of the same and oriented rearwardly in the rotation direction F of rim R as shown in FIG. 4-(g), or in inclined lines with respect to the rotation direction F of the same, and (4) the slits 4 extend inwardly toward the held portion 21 perpendicularly from the braking surface 1, but may alternatively be inclined therefrom with respect to the rotation direction F of rim R, in which the slits 4 are preferred to incline rearwardly relative to the rotation direction F. Thus, the braking distance of 22 m was obtained and the braking effect was greater.

Alternatively, the shoe body 2 may comprise a plurality of projections 28 each having a braking surface 11 and spaced so as not to contact with each other even during the braking action, the projections 28 being all or partially provided with slits 4.

Also, this invention may of course be applicable to a side-pull or center-pull type caliper brake and a rim brake.

Although several embodiments have been described, they are merely exemplary of the invention and not to be construed as limiting, the invention being defined solely by the appended claims.

What is claimed is:

1. A brake shoe for a bicycle brake, said brake shoe for making press contact with a rim of a bicycle wheel to apply a braking force against rotation of the wheel, said brake shoe comprising:
   a shoe body disposed adjacent said rim and elongated in a rotation direction of said rim, said shoe body having a braking surface opposite to a braked surface of said rim, and
   a holder holding said shoe body and mounting said shoe body to said brake, said shoe body having a plurality of slits, each slit extending in a direction transverse to a longitudinal dimension of said braking surface and extending from said braking surface toward a position at which said shoe body is held by said holder, each slit comprising adjacent slit surfaces, each slit being approximately zero in width when no braking action is being applied by said brake shoe against said rim, said adjacent slit surfaces of said slits contacting each other when braking action is being applied by said brake shoe against said rim, said brake shoe comprising elastically deformable surface portions between said slits, said surface portions having edge parts which rise as a result of elastic deformation in response to rotation of said rim relative to said brake shoe when said braking action is being applied.

2. A bicycle brake shoe according to claim 1, wherein said slits extend perpendicularly with respect to said braking surface toward said position at which said shoe body is held by said holder.

3. A bicycle brake shoe according to claim 1, wherein said slits extend toward the position at which said shoe body is held by said holder and are slanted with respect to the braking surface and with respect to a rotation direction of said rim.

4. A bicycle brake shoe according to claim 3, wherein said slits extend toward said position at which said shoe body is held by said holder and are slanted rearwardly in a rotation direction of said rim with respect to said braking surface.

5. A bicycle brake shoe according to claim 1, wherein each said slit is disposed at a central portion of said braking surface relative to a longitudinal dimension of said braking surface.

6. A bicycle brake shoe according to claim 1, wherein said slits are disposed at uniform intervals along the longitudinal dimension of said braking surface.

* * * * *